US012456915B2

(12) United States Patent
Ko et al.

(10) Patent No.: US 12,456,915 B2
(45) Date of Patent: Oct. 28, 2025

(54) REDUCING OUTPUT RIPPLE VOLTAGE OF MULTIPLE SWITCHED CAPACITOR CIRCUITS BY REDUCING OVERLAPPING OF DEAD TIME

(71) Applicant: Richtek Technology Corporation, Zhubei (TW)

(72) Inventors: Chien-Tzu Ko, Chaozhou Township, Pingtung County (TW); Jiun-Jang Lin, Taichung (TW); Yong-Hong Huang, Hemei Township, Changhua County (TW); Jhen-Yu Li, Kaohsiung (TW); Tsung-Wei Huang, Taipei (TW); Sheng-Kai Fan, Hukou Township, Hsinchu County (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 330 days.

(21) Appl. No.: 18/315,643

(22) Filed: May 11, 2023

(65) Prior Publication Data

US 2023/0378866 A1   Nov. 23, 2023

Related U.S. Application Data

(60) Provisional application No. 63/344,068, filed on May 20, 2022.

(30) Foreign Application Priority Data

Mar. 31, 2023   (TW) .................................. 112112547

(51) Int. Cl.
  *H02M 1/14* (2006.01)
  *H02M 3/07* (2006.01)

(52) U.S. Cl.
  CPC ............... *H02M 1/14* (2013.01); *H02M 3/07* (2013.01)

(58) Field of Classification Search
  CPC .................................. H02M 1/14; H02M 3/07
  See application file for complete search history.

(56) References Cited

U.S. PATENT DOCUMENTS

| | | | |
|---|---|---|---|
| 10,651,731 B1* | 5/2020 | Rainer | H02M 3/1588 |
| 2018/0019668 A1 | 1/2018 | Wei | |
| 2021/0067042 A1 | 3/2021 | Liu | |
| 2022/0103066 A1 | 3/2022 | Chen | |
| 2023/0013025 A1* | 1/2023 | Kumar | H02M 1/0095 |

FOREIGN PATENT DOCUMENTS

| | | |
|---|---|---|
| EP | 3975406 A1 | 3/2022 |
| TW | 202112046 A | 3/2021 |

* cited by examiner

*Primary Examiner* — Gary L Laxton
*Assistant Examiner* — Jonathan Walter Soileau
(74) *Attorney, Agent, or Firm* — McClure, Qualey & Rodack, LLP

(57) ABSTRACT

An electronic circuit includes a first switched capacitor circuit and a second switched capacitor circuit. The first switched capacitor circuit charges and discharges a first flying capacitor to power a load. The second switched capacitor charges and discharges a second flying capacitor to power the load. When the first switched capacitor operates in a dead time, the second switched capacitor powers the load with the second flying capacitor.

20 Claims, 13 Drawing Sheets

REDUCING OUTPUT RIPPLE VOLTAGE OF MULTIPLE SWITCHED CAPACITOR CIRCUITS BY REDUCING OVERLAPPING OF DEAD TIME

CROSS REFERENCE TO RELATED APPLICATIONS

This application claims the benefit of U.S. Provisional Application No. 63/344,068, filed on May 20, 2022, the entirety of which is incorporated by reference herein.

This application claims priority of Taiwan Patent Application No. 112112547, filed on Mar. 31, 2023, the entirety of which is incorporated by reference herein.

BACKGROUND OF THE INVENTION

Field of the Invention

The present invention relates to a switched capacitor circuit, and more particularly it relates to an electronic circuit that utilizes a plurality of switched capacitor circuits to supply power to a load, where when at least one of the switched capacitor circuits operates in the dead time, the other switched capacitor circuit continuously supplies power to the load, thereby reducing the ripple of the load voltage.

Description of the Related Art

The switched capacitor circuit has the advantages of high conversion efficiency and no need to use external inductive elements, and is suitable for integration in chips. The switched capacitor circuit includes at least one capacitor and a plurality of switches, and during its operation, the plurality of switches are frequently turned on and off, and the voltage on both terminals of the capacitor also varies frequently, and the supply voltage is then converted into the target voltage.

In order to reduce unnecessary power loss, it is necessary to avoid multiple switches between the supply voltage and the ground being turned on at the same time, and the time when all of the switches are not turned on is called dead time. In order to improve the power conversion efficiency and to reduce the ripple voltage of the output voltage, the control of the dead time of the switched capacitor circuit has become a very important issue.

BRIEF SUMMARY OF THE INVENTION

The present invention proposes an electronic circuit that utilizes a plurality of switched capacitor circuits to supply power to the load. By reducing the overlapping time of the dead time of all switched capacitor circuits, the ripple voltage at the load terminal is reduced, thereby obtaining best circuit performance.

In an embodiment, an electronic circuit is provided, which comprises a first switched capacitor circuit and a second switched capacitor circuit. The first switched capacitor circuit comprises a first flying capacitor, where the first switched capacitor circuit charges and discharges the first flying capacitor and powers a load. The second switched capacitor circuit comprises a second flying capacitor, where the second switched capacitor circuit charges and discharges the second flying capacitor and powers the load. When the first switched capacitor circuit operates in a dead time, the second switched capacitor circuit powers the load with the second flying capacitor.

According to an embodiment of the invention, the first switched capacitor circuit or the second switched capacitor circuit comprises a first transistor, a second transistor, a third transistor, a fourth transistor, and an output capacitor. The first transistor is electrically connected between a supply voltage and a first terminal of a flying capacitor. The second transistor is electrically connected between the first terminal and a load terminal. The load is electrically connected between the load terminal and a ground. The third transistor is electrically connected between the load terminal and a second terminal of the flying capacitor. The fourth transistor is electrically connected between the second terminal and the ground. The output capacitor is electrically connected between the load terminal and the ground.

According to an embodiment of the invention, the flying capacitor corresponds to the first flying capacitor and the second flying capacitor.

According to an embodiment of the invention, when the first transistor and the third transistor are turned on and the second transistor and the fourth transistor are turned off, the supply voltage powers the load through the flying capacitor. When the second transistor and the fourth transistor are turned on and the first transistor and the third transistor are turned off, the flying capacitor and the output capacitor powers the load.

According to an embodiment of the invention, when the first switched capacitor circuit operates in the dead time, the first transistor, the second transistor, the third transistor, and the fourth transistor of the first switched capacitor circuit are all turned off.

According to an embodiment of the invention, when the first transistor and the third transistor of the first switched capacitor circuit are turned on, the second transistor and the fourth transistor of the second switched capacitor circuit are turned on. When the second transistor and the fourth transistor of the first switched capacitor circuit are turned on and the first transistor and the third transistor of the first switched capacitor circuit are turned off, the first transistor and the third transistor of the second switched capacitor circuit are turned on.

According to an embodiment of the invention, when the first transistor and the third transistor of the first switched capacitor circuit are transitioned from on to off, the second transistor and the fourth transistor of the second switched capacitor circuit is delayed by a delay time to transition from on to off.

According to an embodiment of the invention, the delay time is not greater than the dead time.

According to an embodiment of the invention, the electronic circuit sequentially operates in a first mode, a second mode, a third mode, a fourth mode, and a fifth mode.

According to an embodiment of the invention, when the electronic circuit operates in the first mode, the first transistor and the third transistor of the first switched capacitor circuit are turned on, and the second transistor and the fourth transistor of the second switched capacitor circuit are turned on. The supply voltage powers the load through the first flying capacitor and the second capacitor and charges the output capacitor of the first switched circuit and the output capacitor of the second switched circuit.

According to an embodiment of the invention, when the electronic circuit operates in the second mode, the first transistor, the second transistor, the third transistor, and the fourth transistor of the first switched capacitor circuit are all turned off, and the second transistor and the fourth transistor of the second switched capacitor circuit are still turned on. The load is powered by the second flying capacitor, the output capacitor of the first switched capacitor circuit, and the output capacitor of the second switched capacitor circuit.

According to an embodiment of the invention, when the electronic circuit operates in the third mode, the first transistor, the second transistor, the third transistor, and the fourth transistor of both the first switched capacitor circuit and the second switched capacitor circuit are all turned off. The load is powered by the output capacitor of the first switched capacitor circuit and the output capacitor of the second switched capacitor.

According to an embodiment of the invention, when the electronic circuit operates in the fourth mode, the second transistor and the fourth transistor of the first switched capacitor circuit are still turned on, and the first transistor, the second transistor, the third transistor, and the fourth transistor of the second switched capacitor circuit are all turned off. The load is powered by the first flying capacitor, the output capacitor of the first switched capacitor circuit, and the output capacitor of the second switched capacitor circuit.

According to an embodiment of the invention, when the delay time is equal to the dead time, the electronic circuit directly operates in the fourth mode after the second mode and skips the third mode.

According to an embodiment of the invention, when the electronic circuit operates in the fifth mode, the second transistor and the fourth transistor of the first switched capacitor circuit are still turned on, and the first transistor and the third transistor of the second switched capacitor circuit are turned on. The supply voltage powers the load through the second flying capacitor and the first flying capacitor and charges the output capacitor of the first switched capacitor circuit and the output capacitor of the second switched capacitor circuit.

According to an embodiment of the invention, the second switched capacitor circuit controls the first transistor, the second transistor, the third transistor, and the fourth transistor of the second switched capacitor circuit to be turned on or off according to a clock signal.

According to an embodiment of the invention, the electronic circuit further comprises a signal generator. The signal generator comprises a first non-overlapping logic circuit, a first level shift circuit, a second level shift circuit, a third level shift circuit, a fourth level shift circuit, a second non-overlapping logic circuit, a fifth level shift circuit, a sixth level shift circuit, a seventh level shift circuit, and an eighth level shift circuit. The first non-overlapping logic circuit generates a first low-voltage charge signal and a first low-voltage discharge signal according to the clock signal, a first feedback charge signal, a second feedback charge signal, a first feedback discharge signal, and a second feedback discharge signal. The first level shift circuit shifts a voltage level of the first low-voltage charge signal to generate a first charge signal. The second level shift circuit shifts a voltage level of the first low-voltage discharge signal to generate a first discharge signal. The third level shift circuit shifts a voltage level of the first charge signal to generate the first feedback charge signal. The fourth level shift circuit shifts a voltage level of the first discharge signal to generate the first feedback discharge signal. The second non-overlapping logic circuit generates a second low-voltage charge signal and a second low-voltage discharge signal according to the clock signal, the first feedback charge signal, the second feedback charge signal, the first feedback discharge signal, and the second feedback discharge signal. The fifth level shift circuit shifts a voltage level of the second low-voltage charge signal to generate a second charge signal. The sixth level shift circuit shifts a voltage level of the second low-voltage discharge signal to generate a second discharge signal. The seventh level shift circuit shifts a voltage level of the second charge signal to generate the second feedback charge signal. The eighth level shift circuit shifts a voltage level of the second discharge signal to generate the second feedback discharge signal.

According to an embodiment of the invention, the first charge signal is configured to drive the first transistor of the first switched capacitor circuit, the first discharge signal is configured to drive the second transistor of the first switched capacitor circuit, the second charge signal is configured to drive the third transistor of the first switched capacitor circuit, and the second discharge signal is configured to drive the fourth transistor of the first switched capacitor circuit.

According to an embodiment of the invention, the electronic circuit further comprises a first inverter, a delay circuit, a second inverter, and a multiplexer. The first inverter receives the clock signal to generate a first internal clock signal. The delay circuit delays the first internal clock signal by the delay time to generate a second internal clock signal. The second inverter receives the second internal clock signal to generate a delayed clock signal. The multiplexer selects either the clock signal or the delayed clock signal as a drive signal according to a selection signal. The second switched capacitor circuit controls the first transistor, the second transistor, the third transistor, and the fourth transistor of the second switched capacitor circuit to be turned on or off according to the drive signal.

According to an embodiment of the invention, the electronic circuit further comprises another signal generator. The other signal generator generates a third charge signal, a third discharge signal, a fourth charge signal, and a fourth discharge signal according to the drive signal. The third charge signal is configured to drive the first transistor of the second switched capacitor circuit, the third discharge signal is configured to drive the second transistor of the second switched capacitor circuit, the fourth charge signal is configured to drive the third transistor of the second switched capacitor circuit, and the fourth discharge signal is configured to drive the fourth transistor of the second switched capacitor circuit.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
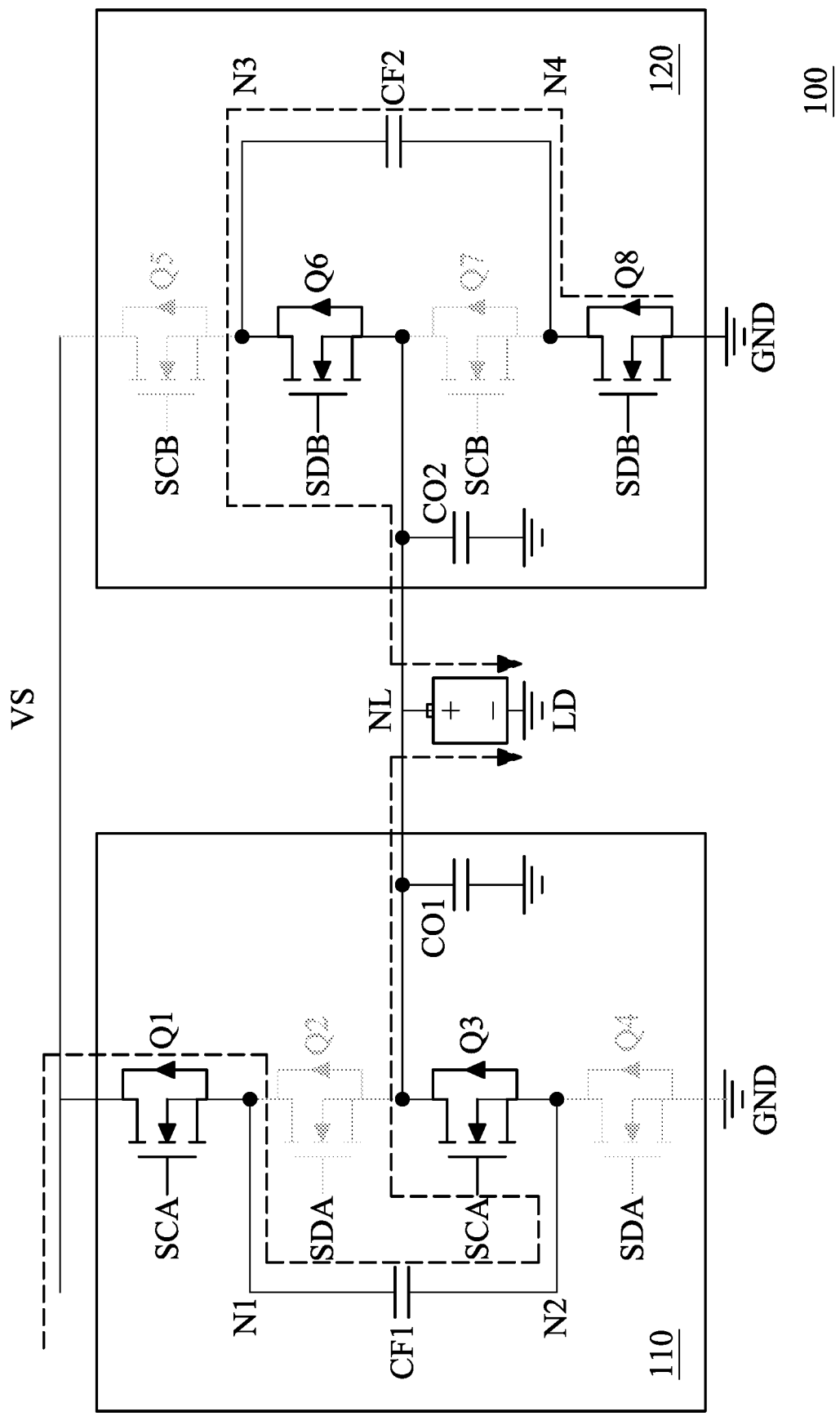
FIGS. 1A-1C are schematic diagrams illustrating the operations of an electronic circuit in accordance with an embodiment of the present invention.

The following description is made for the purpose of illustrating the general principles of the disclosure and should not be taken in a limiting sense. The scope of the disclosure is determined by reference to the appended claims.

In the following detailed description, for purposes of explanation, numerous specific details and embodiments are set forth in order to provide a thorough understanding of the present disclosure. The use of like and/or corresponding numerals in the drawings of different embodiments does not suggest any correlation between different embodiments.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In addition, in this specification, relative spatial expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section in the specification could be termed a second element, component, region, layer, portion or section in the claims without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

The terms "approximately", "about" and "substantially" typically mean a value is within a range of +/−20% of the stated value, more typically a range of +/−10%, +/−5%, +/−3%, +/−2%, +/−1% or +/−0.5% of the stated value. The stated value of the present disclosure is an approximate value. Even there is no specific description, the stated value still includes the meaning of "approximately", "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In the drawings, similar elements and/or features may have the same reference number. Various components of the same type can be distinguished by adding letters or numbers after the component symbol to distinguish similar components and/or similar features.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

Figure 1B:
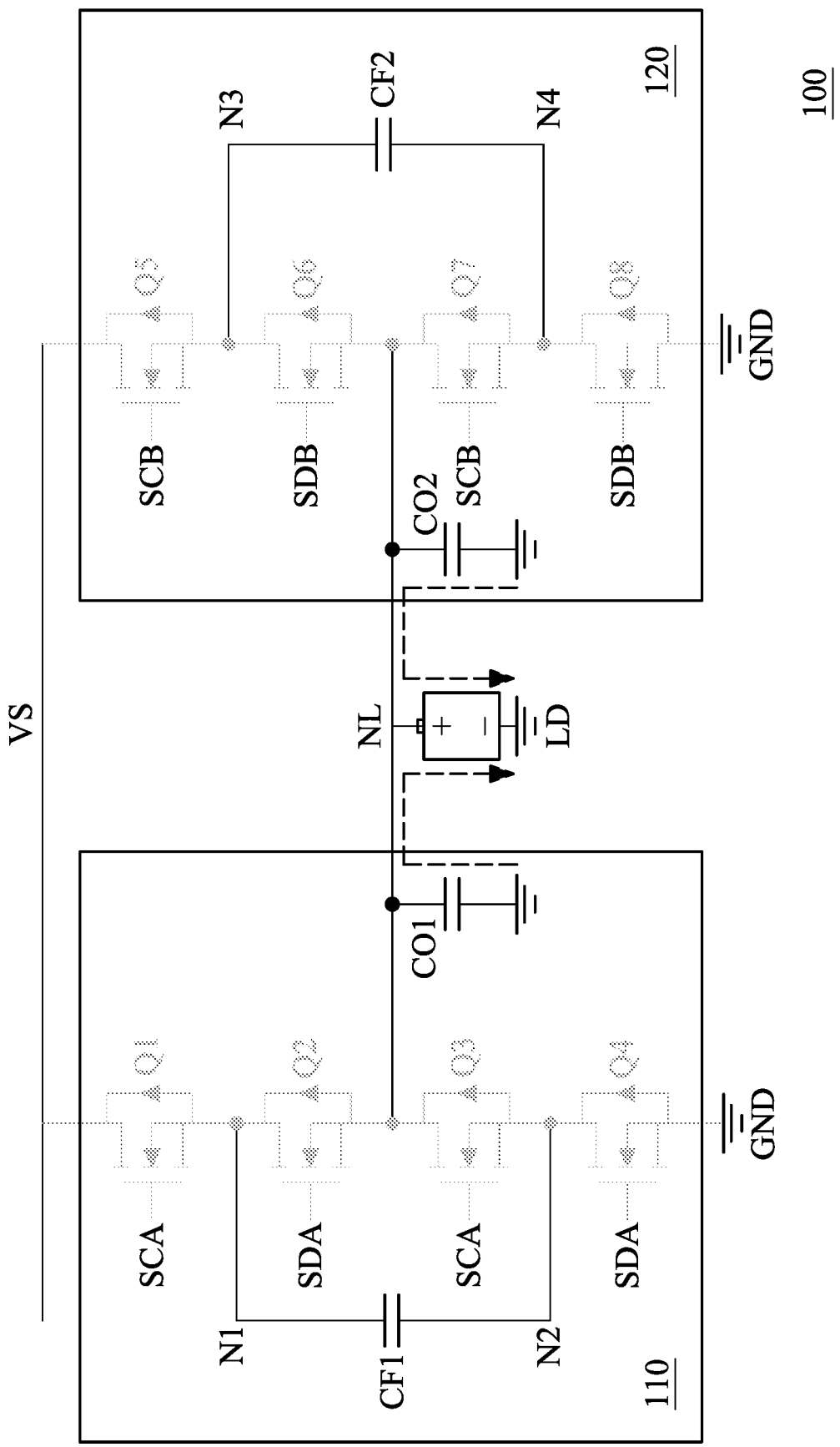
Figure 1C:
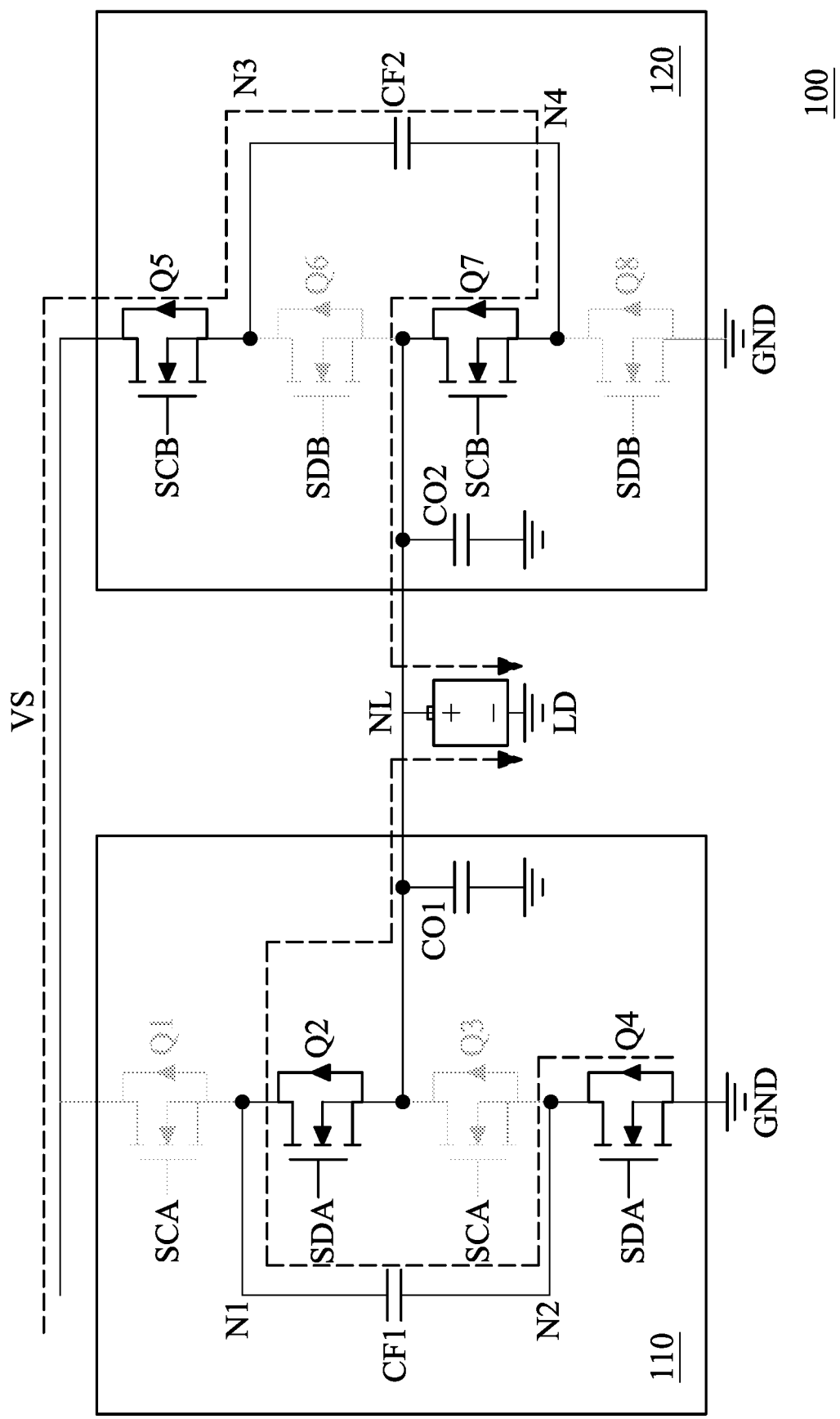

FIGS. 1A-1C are schematic diagrams illustrating the operations of an electronic circuit in accordance with an embodiment of the present invention. As shown in FIGS. 1A-1C, the electronic circuit 100 includes a first switched capacitor circuit 110 and a second switched capacitor circuit 120, where the first switched capacitor circuit 110 and the second switched capacitor circuit 120 are configured to power the load LD with the supply voltage VS. According to an embodiment of the present invention, the load LD can be a battery.

The first switched capacitor circuit 110 includes a first transistor Q1, a first flying capacitor CF1, a second transistor Q2, a third transistor Q3, a fourth transistor Q4, and a first output capacitor CO1. The first transistor Q1 is electrically connected to the supply voltage VS and the first terminal N1 of the first flying capacitor CF1. The second transistor Q2 is electrically connected between the first terminal N1 of the first flying capacitor CF1 and the load terminal NL.

The third transistor Q3 is electrically connected between the load terminal NL and the second terminal N2 of the first flying capacitor CF1, and the fourth transistor Q4 is electrically connected between the second terminal N2 of the first flying capacitor CF1 and the ground GND. The first output capacitor CO1 is electrically connected between the load terminal NL and the ground GND, and the load LD is electrically connected between the load terminal NL and the ground GND.

The second switched capacitor circuit 120 includes a fifth transistor Q5, a second flying capacitor CF2, a sixth transistor Q6, a seventh transistor Q7, an eighth transistor Q8, and a second output capacitor CO2. The fifth transistor Q5 is electrically connected to the supply voltage VS and the third terminal N3 of the second flying capacitor CF2, and the sixth transistor Q6 is electrically connected between the third terminal N3 of the second flying capacitor CF2 and the load terminal NL.

The seventh transistor Q7 is electrically connected between the load terminal NL and the fourth terminal N4 of the second flying capacitor CF2, and the eighth transistor Q8 is electrically connected between the fourth terminal N4 of the second flying capacitor CF2 and the ground GND. The second output capacitor CO2 is electrically connected between the load terminal NL and the ground GND.

As shown in FIGS. 1A-1C, the first transistor Q1 and the third transistor Q3 are controlled by the first charge signal SCA, and the second transistor Q2 and the fourth transistor Q4 are controlled by the first discharge signal SDA. The fifth transistor Q5 and the seventh transistor Q7 are controlled by the second charge signal SCB, and the sixth transistor Q6 and the eighth transistor Q8 are controlled by the second discharge signal SDB.

According to some embodiments of the present invention, since the first transistor Q1 and the third transistor Q3 have different voltage levels to be turned on and off and the first transistor A1 and the third transistor Q3 are simultaneously turned on and off, it is considered that the first transistor Q1 and the third transistor Q3 are controlled by the first charge signal SCA herein for the convenience of description and explanation, but not intended to be limited thereto.

The first transistor Q1, the second transistor Q2, the third transistor Q3, the fourth transistor Q4, the fifth transistor Q5, the sixth transistor Q6, the seventh transistor Q7, and the eighth transistor Q8 are N-type transistors herein for illustration and explanation, and are not limited thereto in any form. According to other embodiments of the present invention, the first transistor Q1, the second transistor Q2, the third transistor Q3, the fourth transistor Q4, the fifth transistor Q5, the sixth transistor Q6, The seventh transistor Q7 and the eighth transistor Q8 may also be P-type transistors or a mixture of N-type transistors and P-type transistors, which will not be repeated herein.

In FIGS. 1A-1C, the electronic circuit 100 operates in the first mode, the second mode, and the third mode in sequence, respectively, where the first mode, the second mode, and the third mode are illustrated in FIGS. 1A-1C respectively. As shown in FIG. 1A, the electronic circuit 100 operates in the first mode, where the first transistor Q1, the third transistor Q3, the sixth transistor Q6, and the eighth transistor Q8 are turned on, so that the supply voltage VS powers the load LD through the first flying capacitor CF1 and a second flying capacitor CF2.

As shown in FIG. 1B, the electronic circuit 100 operates in the second mode, where the first transistor Q1, the second transistor Q2, the third transistor Q3, the fourth transistor Q4, the fifth transistor Q5, the sixth transistor Q6, the seventh transistor Q7, and the eighth transistor Q8 are all turned off. According to an embodiment of the present invention, when the electronic circuit 100 operates in the second mode, the charge stored in the first output capacitor CO1 and the second output capacitor CO2 powers the load LD.

As shown in FIG. 1C, the electronic circuit 100 operates in a third mode, where the second transistor Q2, the fourth transistor Q4, the fifth transistor Q5, and the seventh transistor Q7 are turned on, so that the supply voltage VS powers the load LD through the first flying capacitor CF1 and the second flying capacitor CF2.

According to some embodiments of the present invention, the electronic circuit 100 operates in the first mode, the second mode, and the third mode in sequence, and then returns to the first mode via the second mode from the third mode, and so on. According to an embodiment of the present invention, the time when the electronic circuit 100 operates in the second mode is a dead time to avoid the first transistor Q1, the second transistor Q2, the third transistor Q3, and the fourth transistor Q4 turning on at the same time or the fifth transistor Q5, the sixth transistor Q6, the seventh transistor Q7, and the eighth transistor Q8 turning on at the same time, leading to cause significant power loss.

Figure 2:
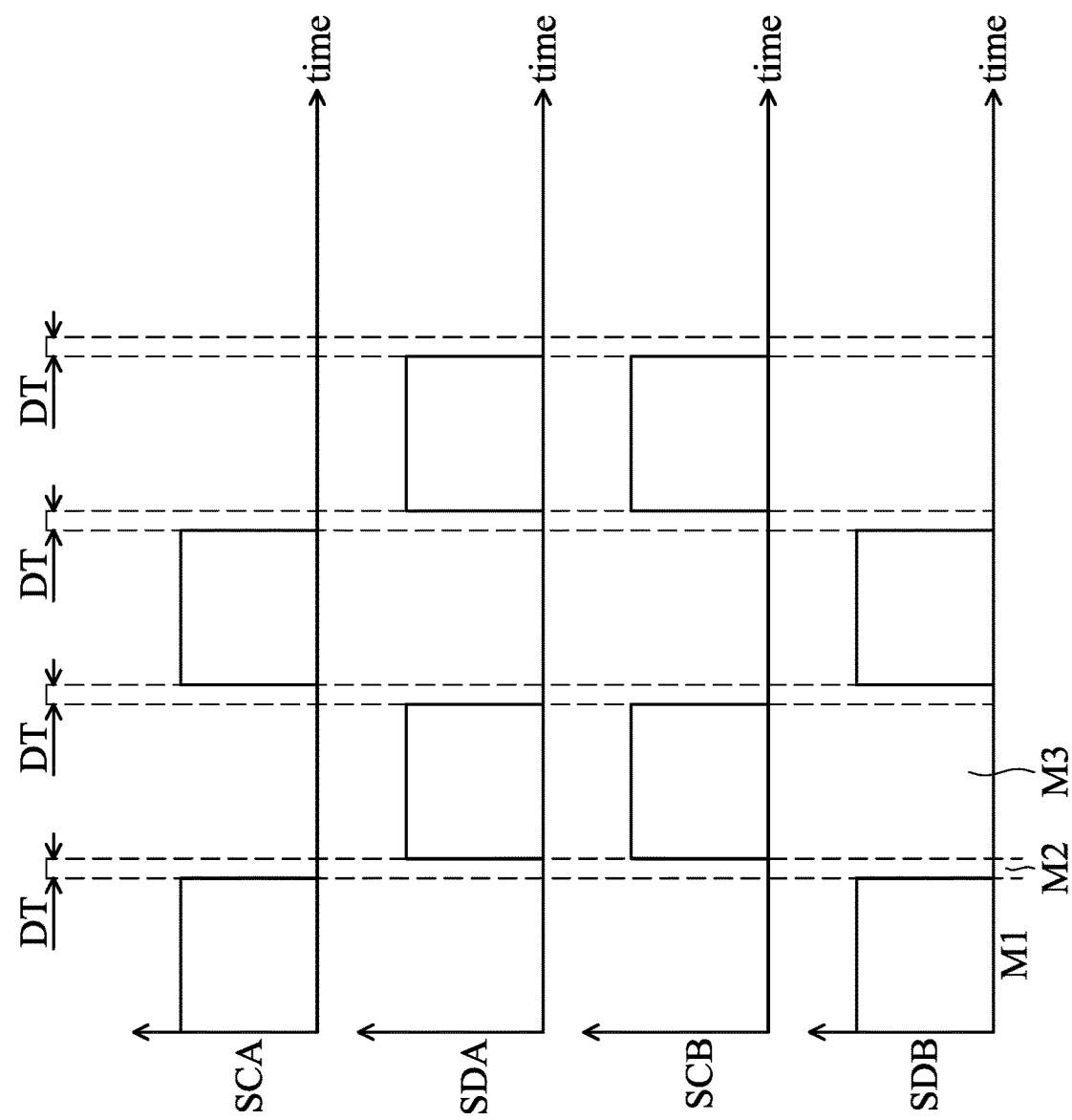
FIG. 2 shows a waveform diagram illustrating a control signal of an electronic circuit in accordance with an embodiment of the present invention.

FIG. 2 shows a waveform diagram illustrating a control signal of an electronic circuit in accordance with an embodiment of the present invention. When the first charge signal SCA, the first discharge signal SDA, the second charge signal SCB or the second discharge signal SDB are at a high logic level, it means that the corresponding controlled transistor is turned on, and a low logic level means that the corresponding transistor is turned off. According to an embodiment of the present invention, the phase difference between the first charge signal SCA and the first discharge signal SDA is 180 degrees, and the phase difference between the first charge signal SCA and the second charge signal SCB is 180 degrees.

As shown in FIG. 2, it is illustrated that the high logic level of the first charge signal SCA and the high logic level of the first discharge signal SDA are separated by a dead time DT and the interval between the high logic level of the second charge signal SCB and the high logic level of the second discharge signal SDB is also the dead time DT for illustration and explanation, and is not limited thereto in any form. In other words, the first charge signal SCA and the second discharge signal SDB both at the high logic level is the first mode M1 and corresponds to FIG. 1A, and the dead time DT is the second mode M2 and corresponds to FIG. 1B. The first discharge signal SDA and the second charge signal SCB both at the high logic level is the third mode M3 and corresponds to FIG. 1C.

According to some embodiments of the present invention, when the electronic circuit 100 operates in the second mode M2, the load LD is only powered by the first output capacitor CO1 and the second output capacitor CO2, so that the voltage level of the load terminal NL in the second mode M2 drops significantly. Therefore, great control of the dead time will help to reduce the ripple voltage at the load terminal NL.

FIGS. 3A-3E are schematic diagrams illustrating the operations of the electronic circuit in accordance with another embodiment of the present invention. In FIGS. 3A-3E, the electronic circuit 100 operates in the fourth mode M4, the fifth mode M5, the sixth mode M6, the seventh mode M7, and the eighth mode M8 in sequence.

Figure 3A:
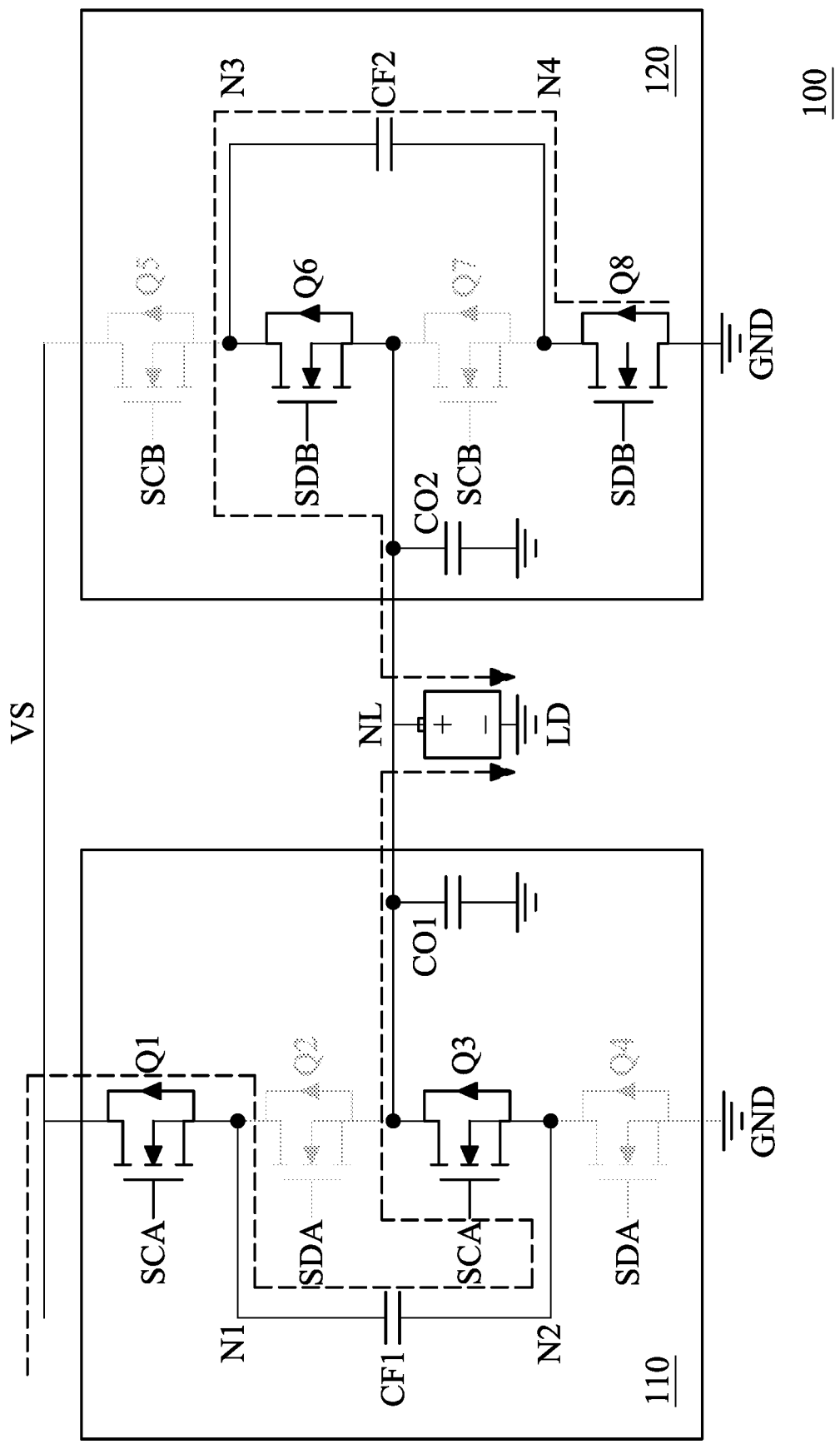
FIGS. 3A-3E are schematic diagrams illustrating the operations of the electronic circuit in accordance with another embodiment of the present invention.
Figure 3B:
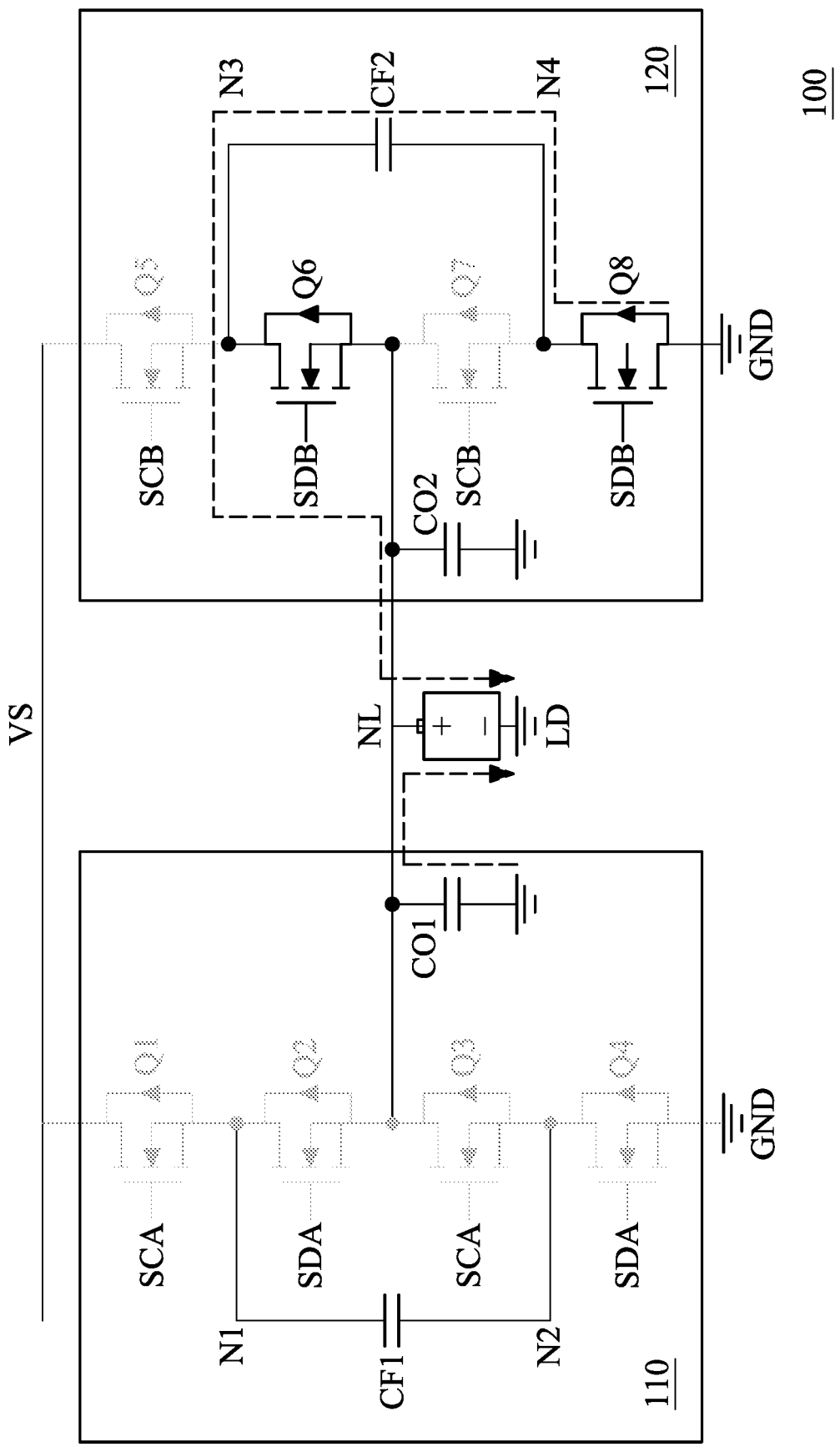
Figure 3C:
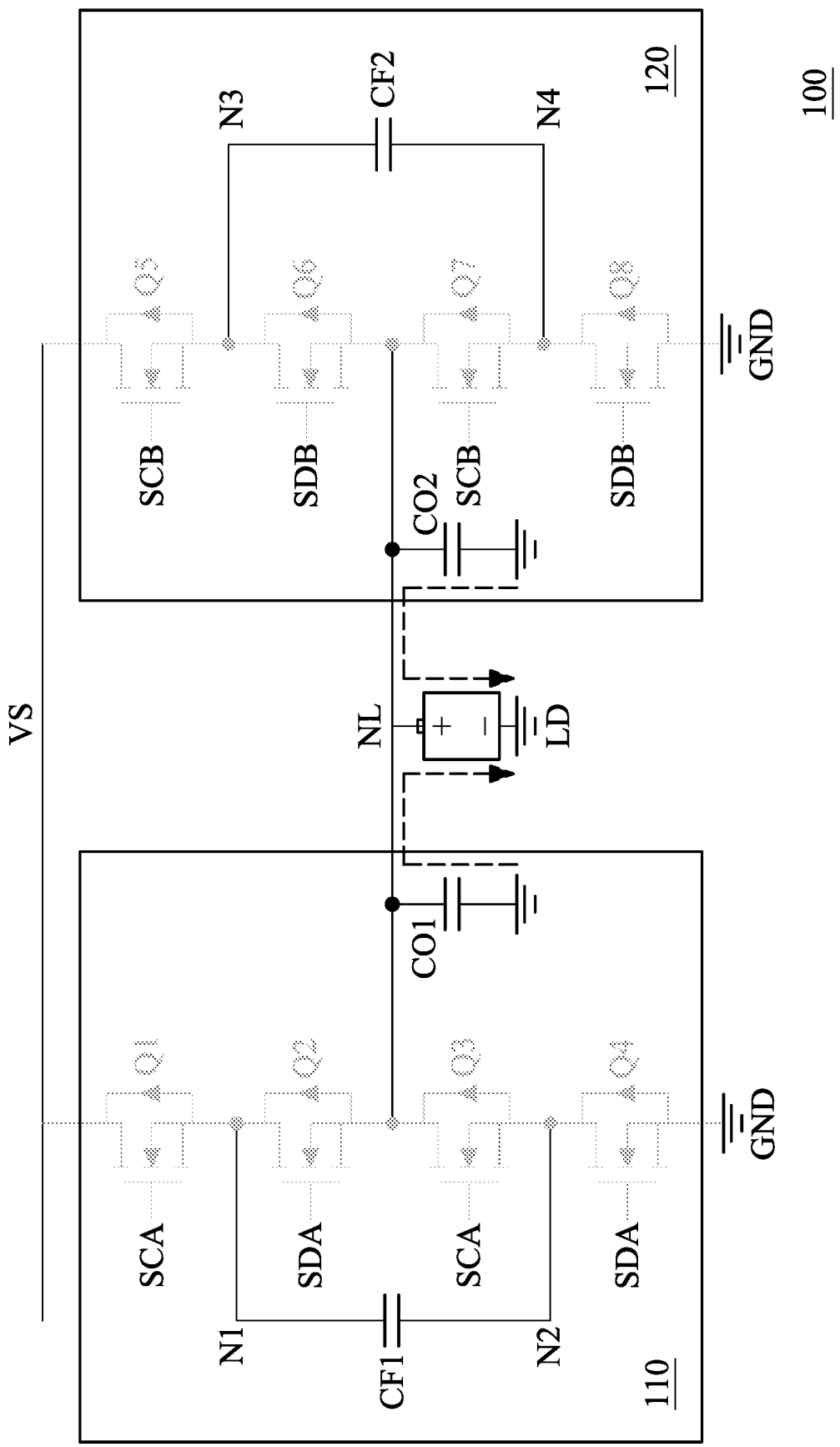
Figure 3D:
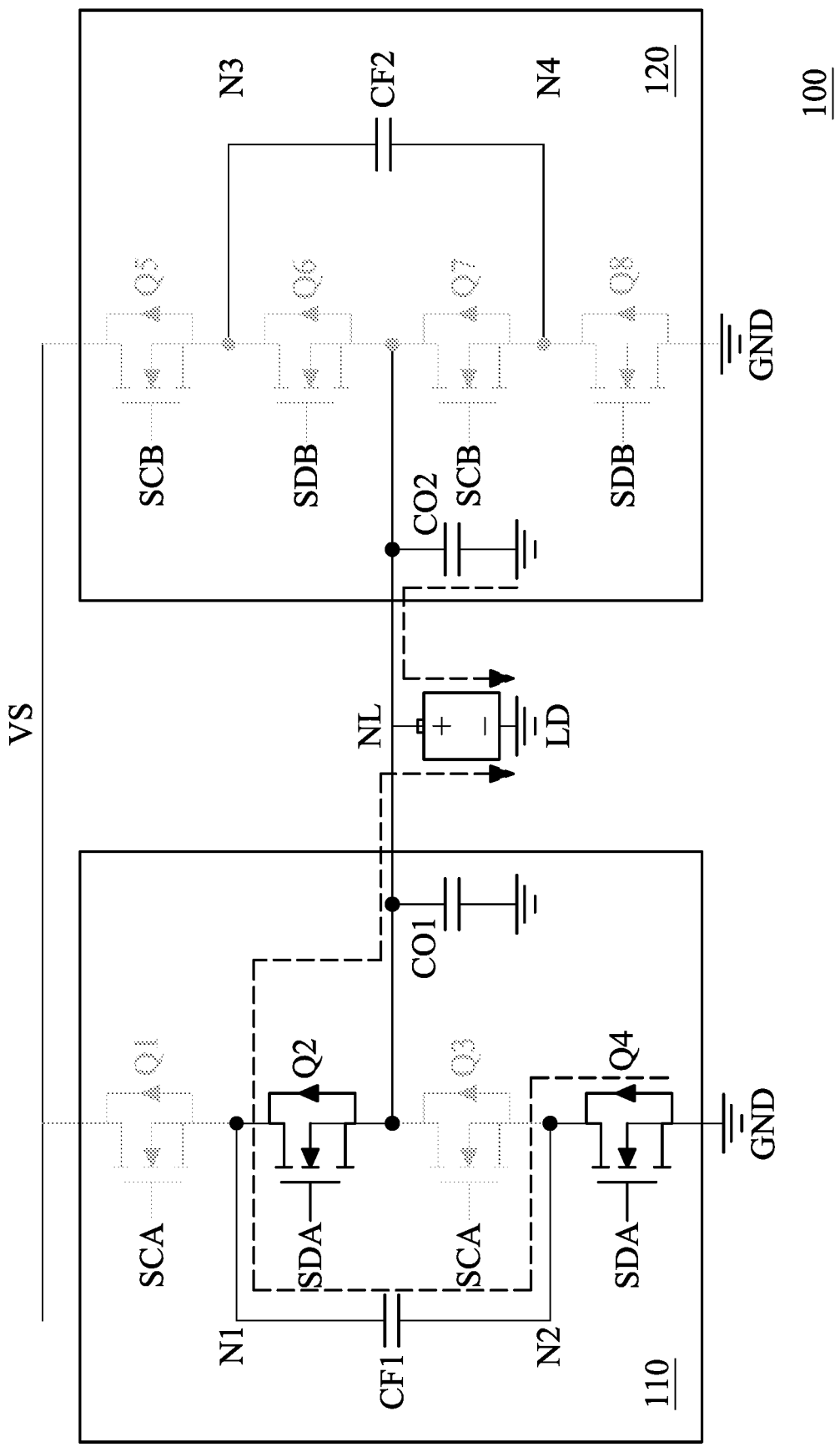
Figure 3E:
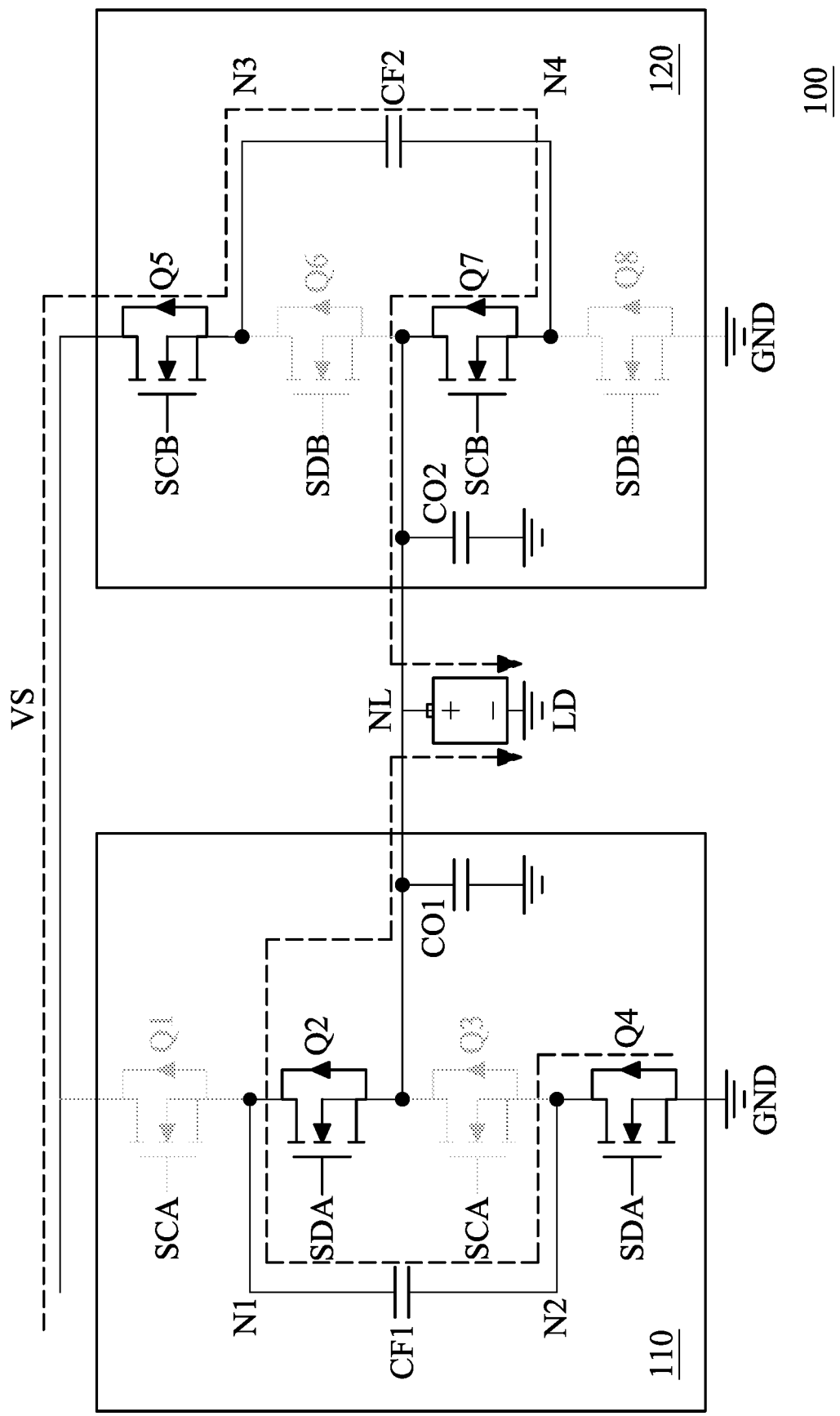
Figure 4:
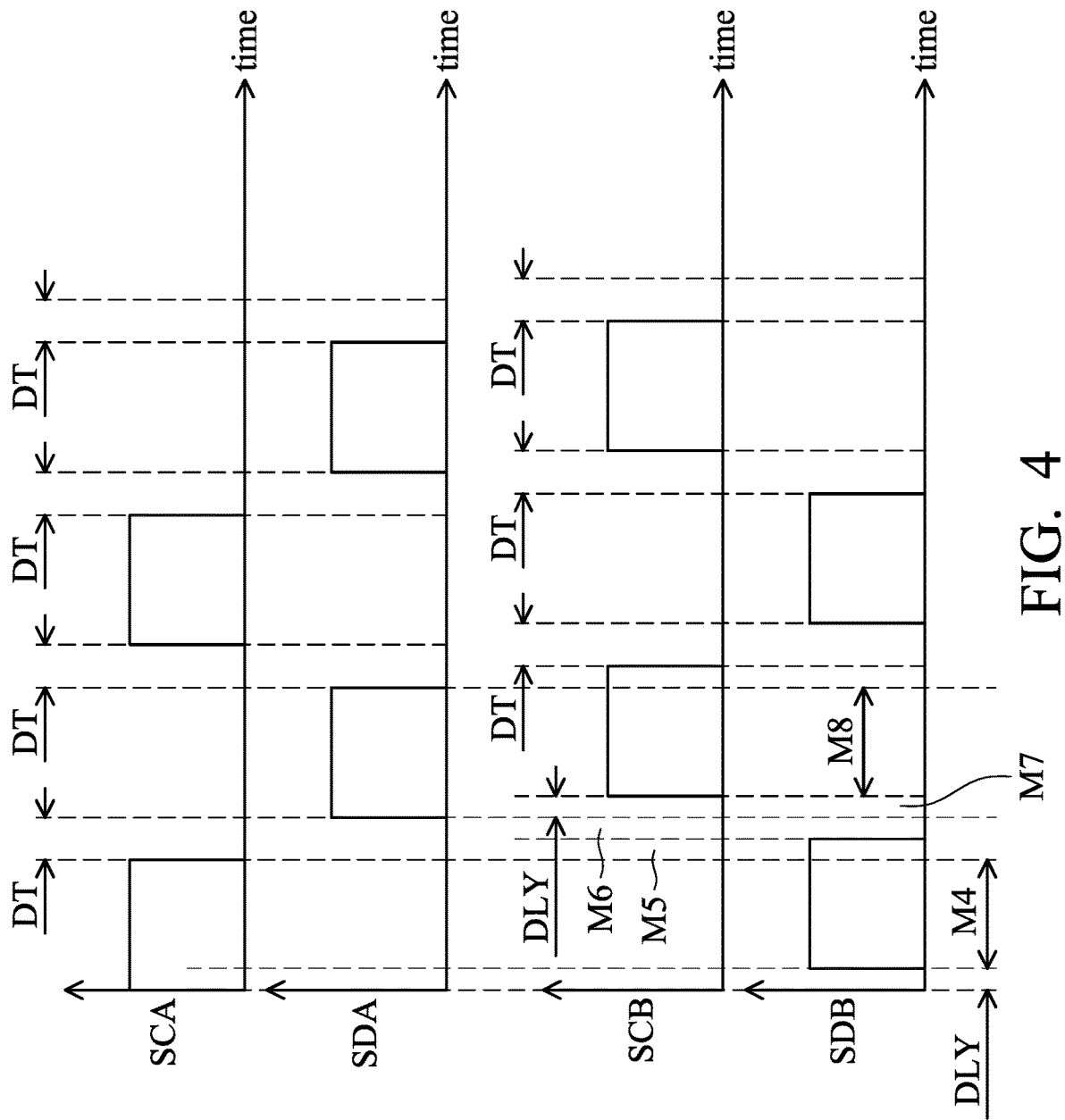
FIG. 4 shows a waveform diagram illustrating a control signal of an electronic circuit in accordance with an embodiment of the present invention.

FIG. 4 shows a waveform diagram illustrating a control signal of an electronic circuit in accordance with an embodiment of the present invention. As shown in FIG. 4, the first charge signal SCA, the first discharge signal SDA, the second charge signal SCB, and the second discharge signal SDB control the electronic circuit 100 to operate in the fourth mode M4, the fifth mode M5, the sixth mode. M6, the seventh mode M7, and the eighth mode M8, which correspond to FIGS. 3A-3E respectively. FIGS. 3A-3E will be described with FIG. 4 in the following paragraphs for detail explanation.

In order to simplify the description, it is illustrated that the first transistor Q1 and the third transistor Q3 are controlled by the first charge signal SCA, that the second transistor Q2 and the fourth transistor Q4 are controlled by the first discharge signal SDA, that the fifth transistor Q5 and the seventh transistor Q7 are controlled by the second charge signal SCB, and that the sixth transistor Q6 and the eighth transistor Q8 are controlled by the second discharge signal SDB for illustration and explanation, and are not limited thereto in any form.

As shown in FIG. 3A and FIG. 4, when the electronic circuit 100 operates in the fourth mode M4, the first charge signal SCA and the second discharge signal SDB are both at a high logic level, so that the first transistor Q1, the third transistor Q3, the sixth transistor Q6, and the eighth transistor Q8 are all turned on, and the supply voltage VS powers the load LD, the first output capacitor CO1, and the second output capacitor CO2 through the first flying capacitor CF1 and the second flying capacitor CF2.

As shown in FIG. 3B and FIG. 4, when the electronic circuit 100 operates in the fifth mode M5, the second discharge signal SDB is at a high logic level, so that the sixth transistor Q6 and the eighth transistor Q8 is turned on, and the load LD is powered by the second flying capacitor CF2, the first output capacitor CO1, and the second output capacitor CO2.

As shown in FIG. 3C and FIG. 4, when the electronic circuit 100 operates in the sixth mode M6, the first charge signal SCA, the first discharge signal SDA, the second charge signal SCB and the second discharge signal SDB are all is a low logic level, so that the first transistor Q1, the second transistor Q2, the third transistor Q3, the fourth transistor Q4, the fifth transistor Q5, the sixth transistor Q6, the seventh transistor Q7 and the All eight transistors Q8 are non-conductive, and only the first output capacitor CO1 and the second output capacitor CO2 supply power to the load LD.

As shown in FIG. 3D and FIG. 4, when the electronic circuit 100 operates in the seventh mode M7, the first discharge signal SDA is at a high logic level, so that the second transistor Q2 and the fourth transistor Q4 are turned on, and the load LD is powered by the first flying capacitor CF1, the first output capacitor CO1 and the second output capacitor CO2.

As shown in FIG. 3E and FIG. 4, when the electronic circuit 100 operates in the eighth mode M8, the first discharge signal SDA and the second charge signal SCB are at a high logic level, so that the second transistor Q2, the fourth transistor Q4, the fifth transistor Q5, and the seventh transistor Q7 are turned on, and the supply voltage VS charges the first output capacitor CO1 and the second output capacitor CO2 and powers the load LD through the first flying capacitor CF1 and the second flying capacitor CF2.

Comparing FIGS. 3A-3E with FIGS. 1A-1C, although the first transistor Q1, the second transistor Q2, The third transistor Q3, the fourth transistor Q4, the fifth transistor Q5, the sixth transistor Q6, the seventh transistor Q7, and the eighth transistor Q8 are all turned off in both the sixth mode M6 of FIG. 3C and the second mode M2 of FIG. 1B, the period of the sixth mode M6 of FIG. 4 is shorter than that of the second mode M2 of FIG. 2 when the dead time DT in FIG. 2 and that in FIG. 4 are the same, so that the voltage drop of the load terminal NL can be alleviated.

Comparing FIG. 4 with FIG. 2, in order to maintain the voltage level of the load terminal NL during the dead time DT, the second charge signal SCB and the second discharge signal SDB are delayed by the delay time DLY, compared to the first charge signal SCA and the first discharge signal SDA. According to some embodiments of the present invention, the delay time DLY is not greater than the dead time DT. In other words, the delay time DLY is less than or equal to the dead time DT. According to some other embodiments of the present invention, the delay time DLY may also be greater than the dead time DT. It is merely illustrated herein that the delay time DLY is less than or equal to the dead time DT for illustration and explanation, but is not limited thereto in any form.

According to an embodiment of the present invention, when the delay time DLY is equal to the dead time DT, the sixth mode M6 illustrated in FIG. 3C no longer exists. In other words, when the delay time DLY is equal to the dead time DT, the first transistor Q1, the second transistor Q2, the third transistor Q3, the fourth transistor Q4, the fifth transistor Q5, the sixth transistor Q6, the seventh transistor Q7, and the eighth transistor Q8 are no longer simultaneously turned off, and the second flying capacitor CF2 (as the fifth mode M5 shown in FIG. 3B) or the first flying capacitor CF1 (as the seventh mode M7 shown in FIG. 3D) is configured to power the load terminal NL at the same time, thereby further reducing the ripple voltage of the load terminal NL.

Figure 5:
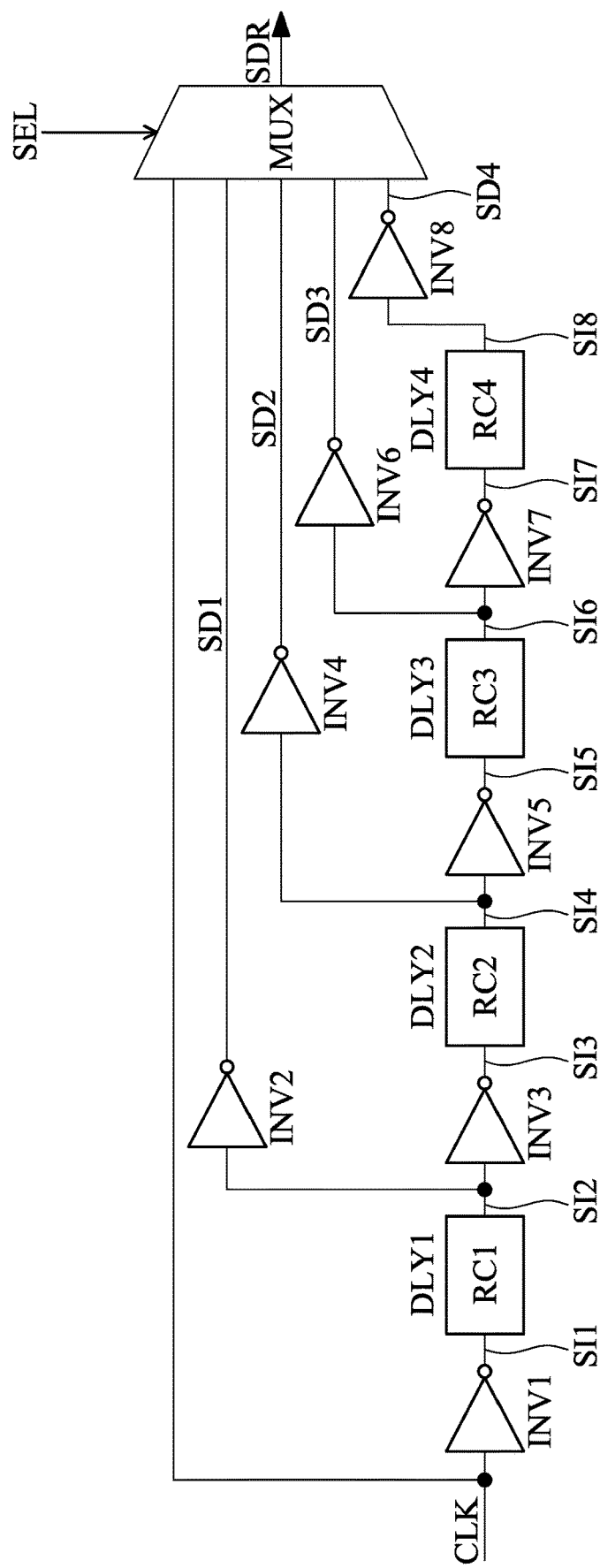
FIG. 5 is a circuit diagram illustrating a clock generator in accordance with an embodiment of the present invention.

FIG. 5 is a circuit diagram illustrating a clock generator in accordance with an embodiment of the present invention, where the clock generator is configured to generate the second charge signal SCB and the second discharge signal SDB delayed by a delay time DLY, compared to the first charge signal SCA and the first discharge signal SDA, in FIGS. 3A-3E. According to an embodiment of the present invention, the electronic circuit 100 generates the second charge signal SCB and the second discharge signal SDB according to the clock signal CLK.

The clock generator 500 includes a first inverter INV1, a first delay circuit RC1, a second inverter INV2, a third inverter INV3, a second delay circuit RC2, a fourth inverter INV4, a fifth inverter INV5, the third delay circuit RC3, the sixth inverter INV6, the seventh inverter INV7, the fourth delay circuit RC4, the eighth inverter INV8, and the multiplexer MUX, where the first inverter INV1, second inverter INV2, third inverter INV3, fourth inverter INV4, fifth inverter INV5, sixth inverter INV6, seventh inverter INV7, and eighth inverter INV8 are configured to increase current drive capability. According to other embodiments of the present invention, the clock generator 500 may include more delay circuits and corresponding inverters. Four delay circuits are merely illustrated herein for explanation, and not limited thereto in any form.

The first inverter INV1 receives the clock signal CLK to generate the first internal clock signal SI1, and the first delay circuit RC1 delays the first internal clock signal SI1 by the first delay time DLY1 to generate the second internal clock signal SI2. The second inverter INV2 receives the second internal clock signal SI2 to generate the first delayed clock signal SD1.

The third inverter INV3 receives the second internal clock signal SI2 to generate the third internal clock signal SI3, and the second delay circuit RC2 delays the third internal clock signal SI3 by the second delay time DLY2 to generate the fourth internal clock signal SI4. The fourth inverter INV4 receives the fourth internal clock signal SI4 to generate the second delayed clock signal SD2.

The fifth inverter INV5 receives the fourth internal clock signal SI4 to generate the fifth internal clock signal SI5. The third delay circuit RC3 delays the fifth internal clock signal SI5 by the third delay time DLY3 to generate the sixth internal clock signal SI6. The sixth inverter INV6 receives the sixth internal clock signal SI6 to generate the third delayed clock signal SD3.

The seventh inverter INV7 receives the sixth internal clock signal SI6 to generate the seventh internal clock signal SI7. The fourth delay circuit RC4 delays the seventh internal clock signal SI7 by the fourth delay time DLY4 to generate the eighth internal clock signal SI8. The eighth inverter INV8 receives the eighth internal clock signal SI8 to generate the fourth delayed clock signal SD4.

According to some embodiments of the present invention, the first delay circuit RC1, the second delay circuit RC2, the third delay circuit RC3, and the fourth delay circuit RC4 can be charged and discharged by resistors and capacitors to generate the first delay time DLY1, the second delay time DLY2, the third delay time DLY3, and the fourth delay time DLY4, where the first delay time DLY1, the second delay time DLY2, the third delay time DLY3, and the fourth delay time DLY4 may be identical or different. According to other embodiments of the present invention, the first delay circuit RC1, the second delay circuit RC2, the third delay circuit RC3 and the fourth delay circuit RC4 may also be constructed by a plurality of inverters electrically connected in series to generate the first delay time DLY1, the second delay time DLY2, the third delay time DLY3, and the fourth delay time DLY4.

According to some embodiments of the present invention, the first delayed clock signal SD1 is delayed by the first delay time DLY1 compared to the clock signal CLK, and the second delayed clock signal SD2 is delayed by a sum of the first delay time DLY1 and the second delay time DLY2 compared to the clock signal CLK. The third delayed clock signal SD3 is delayed by the sum of the first delay time DLY1, the second delay time DLY2, and the third delay time DLY3 compared to the clock signal CLK. The fourth delayed clock signal SD4 is delayed by the sum of the first delay time DLY1, the second delay time DLY2, the third delay time DLY3, and the fourth delay time DLY4 compared to the clock signal CLK.

The multiplexer MUX selects one of the clock signal CLK, the first delayed clock signal SD1, the second delayed clock signal SD2, the third delayed clock signal SD3, and the fourth delayed clock signal SD4 as the driving signal SDR according to the selection signal SEL. The electronic circuit 100 further generates the second charge signal SCB and the second discharge signal SDB according to the driving signal SDR. The electronic circuit 100 can select one of the clock signal CLK, the first delayed clock signal SD1, the second delayed clock signal SD2, the third delayed clock signal SD3, and the fourth delayed clock signal SD4 by the multiplexer MUX, thereby adjusting the delay time DLY in FIG. 4.

Figure 6:
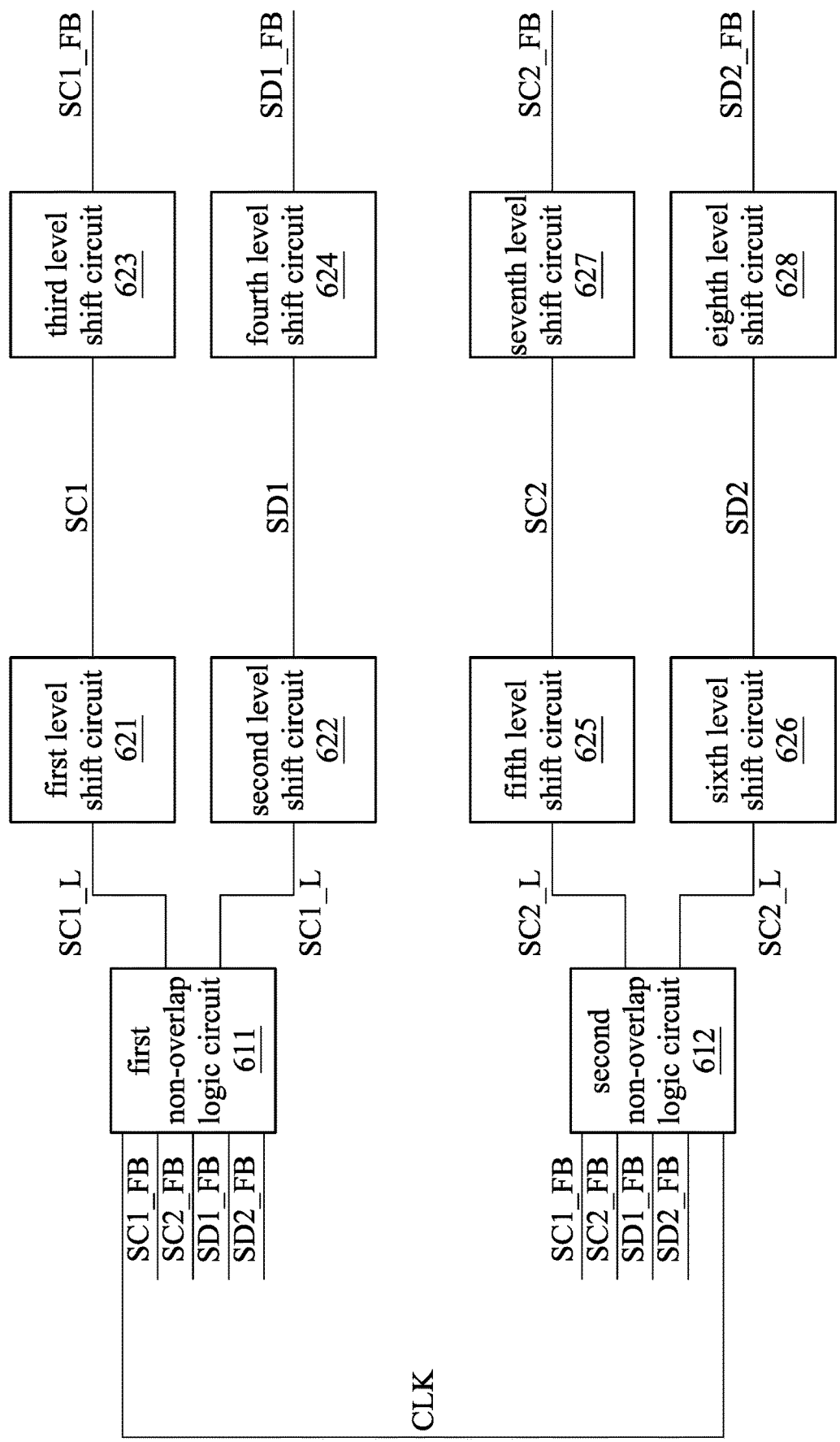
FIG. 6 is a circuit diagram illustrating a clock generator in accordance with another embodiment of the present invention.

FIG. 6 is a circuit diagram illustrating a clock generator in accordance with another embodiment of the present invention. As shown in FIG. 6, the signal generator 600 generates the first charge signal SC1, the first discharge signal SD1, the second charge signal SC2, and the second discharge signal SD2 based on the clock signal CLK. According to an embodiment of the present invention, the first charge signal SC1, the first discharge signal SD1, the second charge signal SC2, and the second discharge signal SD2 generated by the signal generator 600 based on the clock signal CLK are configured to respectively control a first transistor Q1, a second transistor Q2, a third transistor Q3, and a fourth transistor Q4 in FIGS. 3A-3E. According to some embodiments of the present invention, the first charge signal SC1, the first discharge signal SD1, the second charge signal SC2, and the second discharge signal SD2 generated by another signal generator 600 based on the driving signal SDR in FIG. 5 are configured to respectively control the fifth transistor Q5, the sixth transistor Q6, the seventh transistor Q7, and the eighth transistor Q8 in FIGS. 3A-3E, thereby generating the waveform diagram in FIG. 4.

As shown in FIG. 6, the signal generator 600 includes a first non-overlap logic circuit 611, a first level shift circuit 621, a second level shift circuit 622, a third level shift circuit 623, and the fourth level shift circuit 624. The first non-overlapping logic circuit 611 generates the first low-voltage charge signal SC1_L and the first low-voltage discharge signal SD1_L based on the clock signal CLK. The first level shifting circuit 621 and the second level shifting circuit 622 then shift the first low-voltage charge signal SC1_L and the first low-voltage discharge signal SD1_L to the voltage levels corresponding to the driven transistors respectively to generate the first charge signal SC1 and the first discharge signal SD1.

According to an embodiment of the present invention, the first charge signal SC1 is configured to drive the first transistor Q1 in FIGS. 3A-3E, and the first discharge signal SD1 is configured to drive the second transistor Q2 in FIGS. 3A-3E. According to another embodiment of the present invention, when the clock signal CLK is replaced with the drive signal SDR in FIG. 5 to be input to another signal generator 600, the first charge signal SC1 and the first discharge signal SD1 is generated by another signal generator 600 based on the drive signal SDR in FIG. 5. The first charge signal SC1 is configured to drive the fifth transistor Q5 in FIGS. 3A-3E, and the first discharge signal SD1 is configured to drive the sixth transistor Q6 in FIGS. 3A-3E.

As shown in FIG. 6, the third level shift circuit 623 and the fourth level shift circuit 624 convert the voltage levels of the first charge signal SC1 and the first discharge signal SD1 into the voltage level of the first non-overlapping logic circuit 611 to generate the first feedback charge signal SC1_FB and the first feedback discharge signal SD1_FB respectively. According to an embodiment of the present invention, the voltage levels of the first feedback charge signal SC1_FB, the first feedback discharge signal SD1_FB, the first low-voltage charge signal SC1_L, and the first low-voltage discharge signal SD1_L are the same.

As shown in FIG. 6, the signal generator 600 further includes a second non-overlap logic circuit 612, a fifth level shift circuit 625, a sixth level shift circuit 626, a seventh level shift circuit 627, and an eighth level shift circuit 628. The second non-overlapping logic circuit 612 generates the second low-voltage charge signal SC2_L and the second low-voltage discharge signal SD2_L based on the clock signal CLK. The fifth level shifting circuit 625 and the sixth level shifting circuit 626 convert the second low-voltage charge signal SC2_L and the second low-voltage discharge signal SD2_L into the corresponding voltage levels of the driven transistors to generate second charge signal SC2 and the second discharge signal SD2 respectively.

According to an embodiment of the present invention, the second charge signal SC2 is configured to drive the third transistor Q3 in FIGS. 3A-3E, and the second discharge signal SD2 is configured to drive the fourth transistor Q4 in FIGS. 3A-3E. According to another embodiment of the present invention, when the clock signal CLK is replaced by the driving signal SDR in FIG. 5 and input to another signal generator 600, the other signal generator 600 generates a second charge signal SC2 and a second discharge signal SD2 based on the drive signal SDR in FIG. 5, the second charge signal SC2 is configured to drive the seventh transistor Q7 in FIGS. 3A-3E, and the second discharge signal SD2 is configured to drive the eighth transistor Q8 in FIGS. 3A-3E.

The seventh level shift circuit 627 and the eighth level shift circuit 628 respectively convert the voltage levels of the second charge signal SC2 and the second discharge signal SD2 into the voltage level of the second non-overlapping logic circuit 612 to generate the second feedback charge signal SC2_FB and the second feedback discharge signal SD2_FB respectively. According to an embodiment of the present invention, the voltage levels of the second feedback charge signal SC2_FB, the second feedback discharge signal SD2_FB, the second low-voltage charge signal SC2_L and the second low-voltage discharge signal SD2_L are the same.

Figure 7:
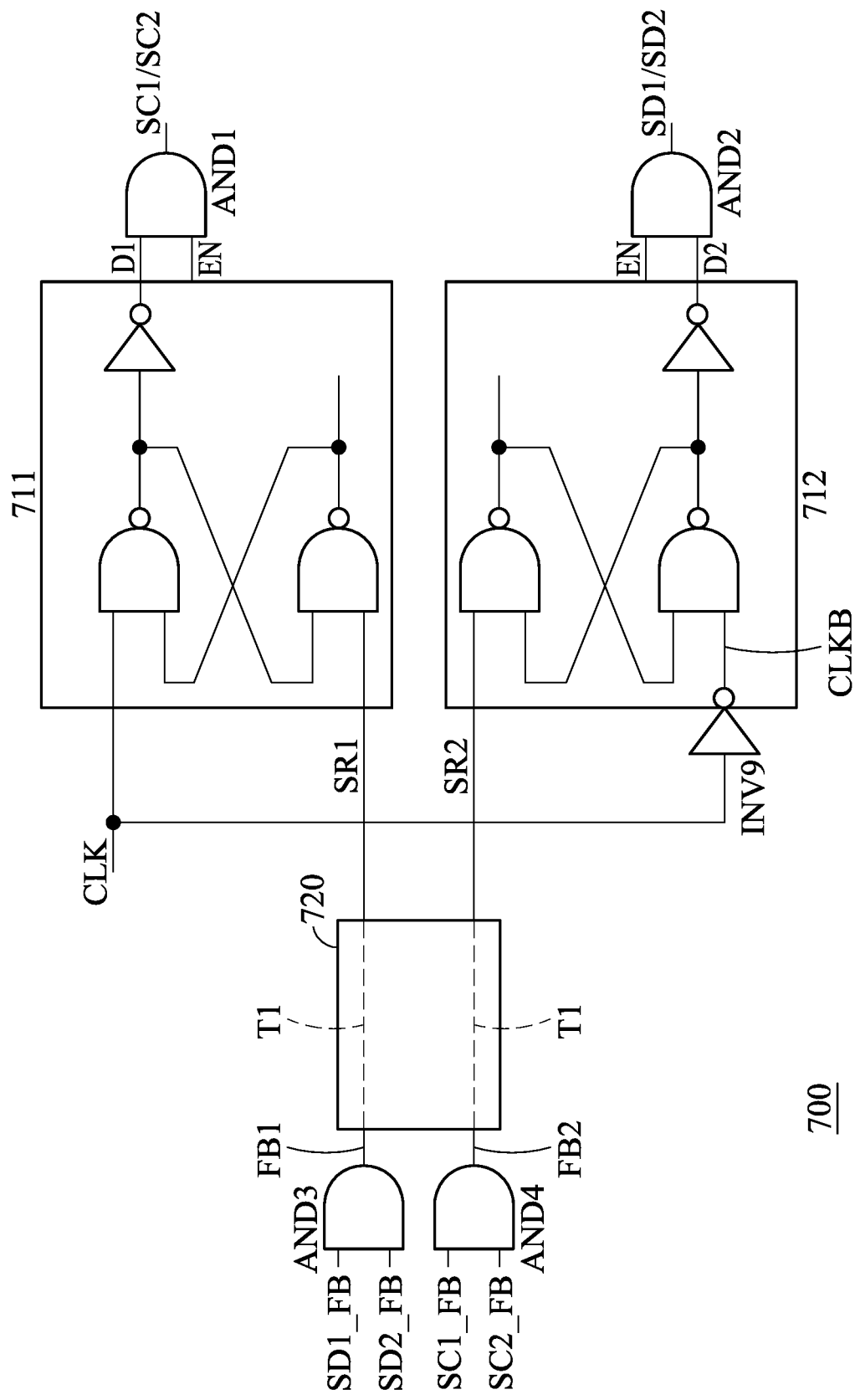
FIG. 7 shows a waveform diagram illustrating a driving signal of an electronic circuit in accordance with an embodiment of the present invention.

FIG. 7 shows a waveform diagram illustrating a driving signal of an electronic circuit in accordance with an embodiment of the present invention, where the non-overlapping logic circuit 700 corresponds to the first non-overlapping logic circuit 611 and the second non-overlapping logic circuit 612 in FIG. 6. As shown in FIG. 7, the non-overlapping logic circuit 700 includes a first latch circuit 711, a first AND gate AND1, a ninth inverter INV9, a second latch circuit 712, and a second AND gate AND2.

The first latch circuit 711 outputs the clock signal CLK as the first output signal D1, and the first AND gate AND1 performs a logical AND operation on the first output signal D1 and the enable signal EN to generate the first charge signal SC1 or the second charge signal SC2. According to an embodiment of the present invention, when the non-overlapping logic circuit 700 corresponds to the first non-overlapping logic circuit 611 in FIG. 6, the first AND gate AND1 outputs the first charge signal SC1. According to another embodiment of the present invention, when the non-overlapping logic circuit 700 corresponds to the second non-overlapping logic circuit 612 in FIG. 6, the first AND gate AND1 outputs the second charge signal SC2.

According to an embodiment of the present invention, the non-overlapping logic circuit 700 starts to output the first charge signal SC1/second charge signal SC2 and the first discharge signal SD1/second discharge signal SD2 according to the enable signal EN. In other words, the enable signal EN is configured to enable the electronic circuit 100 in FIGS. 3A-3E.

The ninth inverter INV9 inverts the clock signal CLK to generate an inverted clock signal CLKB. The second latch circuit 712 outputs the inverted clock signal CLKB as the second output signal D2. The second AND gate AND2 performs a logical AND operation on the second output signal D2 and the enable signal EN to generate the first discharge signal SD1 or the second discharge signal SD2. According to an embodiment of the present invention, when the non-overlapping logic circuit 700 corresponds to the first non-overlapping logic circuit 611 in FIG. 6, the second AND gate AND2 outputs the first discharge signal SD1. According to another embodiment of the present invention, when the non-overlapping logic circuit 700 corresponds to the second non-overlapping logic circuit 612 in FIG. 6, the second AND gate AND2 outputs the second discharge signal SD2.

As shown in FIG. 7, the non-overlapping logic circuit 700 further includes a third AND gate AND3, a fourth AND gate AND4, and a delay control circuit 720. The third AND gate AND3 performs a logical AND operation on the first feedback discharge signal SD1_FB and the second feedback discharge signal SD2_FB to generate the first feedback signal FB1, and the fourth AND gate AND4 performs a logical AND operation on the first feedback charge signal SC1_FB and the second feedback discharge signal SC1_FB. The feedback charge signal SC2_FB performs a logical AND operation to generate a second feedback signal FB2.

The delay control circuit 720 is configured to generate the first reset signal SR1 according to the first feedback signal FB1 and to generate the second reset signal SR2 according to the second feedback signal FB2. According to an embodiment of the present invention, when any one of the first feedback discharge signal SD1_FB and the second feedback discharge signal SD2_FB switches from a high logic level to a low logic level, the first feedback signal FB1 generates a falling edge, so that the delay control circuit 720 outputs the first reset signal SR1 at the low logic level for a first time T1 according to the falling edge of the first feedback signal FB1.

According to another embodiment of the present invention, when either the first feedback charge signal SC1_FB or the second feedback charge signal SC2_FB switches from the high logic level to the low logic level, the second feedback signal FB2 generates a falling edge, so that the delay control circuit 720 outputs the second reset signal SR2 at a low logic level for the first time T1 according to the falling edge of the second feedback signal FB2. According to an embodiment of the present invention, the first time T1 is equal to the dead time DT in FIG. 4.

When the first latch circuit 711 (or the second latch circuit 712) receives the first reset signal SR1 (or the second reset signal SR2) is at the low logic level, the first output signal D1 is at the high logic level.

As shown in FIG. 6 and FIG. 7, the signal generator 600 adjusts the first charge signal SC1, the first discharge signal SD1, the second charge signal SC2, and the second discharge signal SD2 based on the first feedback charge signal SC1_FB, the first feedback discharge signal SD1_FB, the second feedback charge signal SC2_FB, and the second feedback discharge signal SD2_FB. In addition, the clock generator 500 in FIG. 5 delays the clock signal CLK to generate the driving signal SDR. Another signal generator 600 can generate signals to control the fifth transistor Q5, the sixth transistor Q6, the seventh transistor Q7, and the eighth transistor Q8 in FIGS. 3A-3E based on the driving signal SDR, thereby achieving the purpose of the waveform diagram in FIG. 4 to control the electronic circuit 100 in FIGS. 3A-3E.

The present invention proposes an electronic circuit that utilizes a plurality of switched capacitor circuits to supply power to the load. By reducing the overlapping time of the dead time of all switched capacitor circuits, the ripple voltage at the load terminal is reduced, thereby obtaining best circuit performance.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. An electronic circuit, comprising:
a first switched capacitor circuit, comprising a first flying capacitor, wherein the first switched capacitor circuit charges and discharges the first flying capacitor and powers a load; and a second switched capacitor circuit, comprising a second flying capacitor, wherein the second switched capacitor circuit charges and discharges the second flying capacitor and powers the load;
wherein when the first switched capacitor circuit operates in a dead time, the second switched capacitor circuit powers the load with the second flying capacitor;
wherein the first switched capacitor circuit or the second switched capacitor circuit comprises:
a first transistor, electrically connected between a supply voltage and a first terminal of the first flying capacitor or the second flying capacitor;
a second transistor, electrically connected between the first terminal and a load terminal, wherein the load is electrically connected between the load terminal and a ground;
a third transistor, electrically connected between the load terminal and a second terminal of the first flying capacitor or the second flying capacitor;
a fourth transistor, electrically connected between the second terminal and the ground; and
an output capacitor, electrically connected between the load terminal and the ground;
wherein when the electronic circuit operates in a first mode, the first transistor and the third transistor of the first switched capacitor circuit are turned on, and the second transistor and the fourth transistor of the second switched capacitor circuit are turned on;
wherein the supply voltage powers the load through the first flying capacitor and the second flying capacitor and charges the output capacitor of the first switched circuit and the output capacitor of the second switched circuit.

2. The electronic circuit as defined in claim 1, wherein when the first transistor and the third transistor are turned on and the second transistor and the fourth transistor are turned off, the supply voltage powers the load through the flying capacitor;
wherein when the second transistor and the fourth transistor are turned on and the first transistor and the third transistor are turned off, the flying capacitor and the output capacitor powers the load.

3. The electronic circuit as defined in claim 1, wherein when the first switched capacitor circuit operates in the dead time, the first transistor, the second transistor, the third transistor, and the fourth transistor of the first switched capacitor circuit are all turned off.

4. The electronic circuit as defined in claim 3, wherein when the first transistor and the third transistor of the first switched capacitor circuit are turned on, the second transistor and the fourth transistor of the second switched capacitor circuit are turned on;
wherein when the second transistor and the fourth transistor of the first switched capacitor circuit are turned on and the first transistor and the third transistor of the first switched capacitor circuit are turned off, the first transistor and the third transistor of the second switched capacitor circuit are turned on.

5. The electronic circuit as defined in claim 4, wherein when the first transistor and the third transistor of the first switched capacitor circuit are transitioned from on to off, the second transistor and the fourth transistor of the second switched capacitor circuit is delayed by a delay time to transition from on to off.

6. The electronic circuit as defined in claim 5, wherein the delay time is not greater than the dead time.

7. The electronic circuit as defined in claim 5, wherein the electronic circuit sequentially operates in the first mode, a second mode, a third mode, a fourth mode, and a fifth mode.

8. The electronic circuit as defined in claim 7, wherein when the electronic circuit operates in the second mode, the first transistor, the second transistor, the third transistor, and the fourth transistor of the first switched capacitor circuit are all turned off, and the second transistor and the fourth transistor of the second switched capacitor circuit are still turned on;
wherein the load is powered by the second flying capacitor, the output capacitor of the first switched capacitor circuit, and the output capacitor of the second switched capacitor circuit.

9. The electronic circuit as defined in claim 8, wherein when the electronic circuit operates in the third mode, the first transistor, the second transistor, the third transistor, and the fourth transistor of both the first switched capacitor circuit and the second switched capacitor circuit are all turned off;
wherein the load is powered by the output capacitor of the first switched capacitor circuit and the output capacitor of the second switched capacitor.

10. The electronic circuit as defined in claim 9, wherein when the electronic circuit operates in the fourth mode, the second transistor and the fourth transistor of the first switched capacitor circuit are still turned on, and the first transistor, the second transistor, the third transistor, and the fourth transistor of the second switched capacitor circuit are all turned off;
wherein the load is powered by the first flying capacitor, the output capacitor of the first switched capacitor circuit, and the output capacitor of the second switched capacitor circuit.

11. The electronic circuit as defined in claim 10, wherein when the delay time is equal to the dead time, the electronic circuit directly operates in the fourth mode after the second mode and skips the third mode.

12. The electronic circuit as defined in claim 10, wherein when the electronic circuit operates in the fifth mode, the second transistor and the fourth transistor of the first switched capacitor circuit are still turned on, and the first transistor and the third transistor of the second switched capacitor circuit are turned on;
wherein the supply voltage powers the load through the second flying capacitor and the first flying capacitor and charges the output capacitor of the first switched capacitor circuit and the output capacitor of the second switched capacitor circuit.

13. The electronic circuit as defined in claim 5, wherein the second switched capacitor circuit controls the first transistor, the second transistor, the third transistor, and the fourth transistor of the second switched capacitor circuit to be turned on or off according to a clock signal.

14. The electronic circuit as defined in claim 13, further comprising:
a signal generator, comprising:
a first non-overlapping logic circuit, generating a first low-voltage charge signal and a first low-voltage discharge signal according to the clock signal, a first feedback charge signal, a second feedback charge signal, a first feedback discharge signal, and a second feedback discharge signal;
a first level shift circuit, shifting a voltage level of the first low-voltage charge signal to generate a first charge signal;

a second level shift circuit, shifting a voltage level of the first low-voltage discharge signal to generate a first discharge signal;

a third level shift circuit, shifting a voltage level of the first charge signal to generate the first feedback charge signal;

a fourth level shift circuit, shifting a voltage level of the first discharge signal to generate the first feedback discharge signal;

a second non-overlapping logic circuit, generating a second low-voltage charge signal and a second low-voltage discharge signal according to the clock signal, the first feedback charge signal, the second feedback charge signal, the first feedback discharge signal, and the second feedback discharge signal;

a fifth level shift circuit, shifting a voltage level of the second low-voltage charge signal to generate a second charge signal;

a sixth level shift circuit, shifting a voltage level of the second low-voltage discharge signal to generate a second discharge signal;

a seventh level shift circuit, shifting a voltage level of the second charge signal to generate the second feedback charge signal; and an eighth level shift circuit, shifting a voltage level of the second discharge signal to generate the second feedback discharge signal.

15. The electronic circuit as defined in claim 14, wherein the first charge signal is configured to drive the first transistor of the first switched capacitor circuit, the first discharge signal is configured to drive the second transistor of the first switched capacitor circuit, the second charge signal is configured to drive the third transistor of the first switched capacitor circuit, and the second discharge signal is configured to drive the fourth transistor of the first switched capacitor circuit.

16. The electronic circuit as defined in claim 15, further comprising:
    a first inverter, receiving the clock signal to generate a first internal clock signal;
    a delay circuit, delaying the first internal clock signal by the delay time to generate a second internal clock signal;
    a second inverter, receiving the second internal clock signal to generate a delayed clock signal; and
    a multiplexer, selecting either the clock signal or the delayed clock signal as a drive signal according to a selection signal;
    wherein the second switched capacitor circuit controls the first transistor, the second transistor, the third transistor, and the fourth transistor of the second switched capacitor circuit to be turned on or off according to the drive signal.

17. The electronic circuit as defined in claim 15, further comprising another signal generator, wherein the other signal generator generates a third charge signal, a third discharge signal, a fourth charge signal, and a fourth discharge signal according to the drive signal, wherein the third charge signal is configured to drive the first transistor of the second switched capacitor circuit, the third discharge signal is configured to drive the second transistor of the second switched capacitor circuit, the fourth charge signal is configured to drive the third transistor of the second switched capacitor circuit, and the fourth discharge signal is configured to drive the fourth transistor of the second switched capacitor circuit.

18. An electronic circuit, comprising:

a first switched capacitor circuit, comprising a first flying capacitor, wherein the first switched capacitor circuit charges and discharges the first flying capacitor and powers a load; and a second switched capacitor circuit, comprising a second flying capacitor, wherein the second switched capacitor circuit charges and discharges the second flying capacitor and powers the load;

wherein when the first switched capacitor circuit operates in a dead time, the second switched capacitor circuit powers the load with the second flying capacitor;

wherein when the first switched capacitor circuit operates in a dead time, the second switched capacitor circuit powers the load with the second flying capacitor;

wherein the first switched capacitor circuit or the second switched capacitor circuit comprises:

a first transistor, electrically connected between a supply voltage and a first terminal of the first flying capacitor or the second flying capacitor;

a second transistor, electrically connected between the first terminal and a load terminal, wherein the load is electrically connected between the load terminal and a ground;

a third transistor, electrically connected between the load terminal and a second terminal of the first flying capacitor or the second flying capacitor;

a fourth transistor, electrically connected between the second terminal and the ground; and an output capacitor, electrically connected between the load terminal and the ground;

wherein the electronic circuit further comprises:

a signal generator, comprising:

a first non-overlapping logic circuit, generating a first low-voltage charge signal and a first low-voltage discharge signal according to the clock signal, a first feedback charge signal, a second feedback charge signal, a first feedback discharge signal, and a second feedback discharge signal;

a first level shift circuit, shifting a voltage level of the first low-voltage charge signal to generate a first charge signal;

a second level shift circuit, shifting a voltage level of the first low-voltage discharge signal to generate a first discharge signal;

a third level shift circuit, shifting a voltage level of the first charge signal to generate the first feedback charge signal;

a fourth level shift circuit, shifting a voltage level of the first discharge signal to generate the first feedback discharge signal;

a second non-overlapping logic circuit, generating a second low-voltage charge signal and a second low-voltage discharge signal according to the clock signal, the first feedback charge signal, the second feedback charge signal, the first feedback discharge signal, and the second feedback discharge signal;

a fifth level shift circuit, shifting a voltage level of the second low-voltage charge signal to generate a second charge signal;

a sixth level shift circuit, shifting a voltage level of the second low-voltage discharge signal to generate a second discharge signal;

a seventh level shift circuit, shifting a voltage level of the second charge signal to generate the second feedback charge signal; and an eighth level shift circuit, shifting a voltage level of the second discharge signal to generate the second feedback discharge signal.

19. The electronic circuit as defined in claim 18, wherein the first charge signal is configured to drive the first transistor of the first switched capacitor circuit, the first discharge signal is configured to drive the second transistor of the first switched capacitor circuit, the second charge signal is configured to drive the third transistor of the first switched capacitor circuit, and the second discharge signal is configured to drive the fourth transistor of the first switched capacitor circuit.

20. The electronic circuit as defined in claim 19, further comprising:
  a first inverter, receiving the clock signal to generate a first internal clock signal;
  a delay circuit, delaying the first internal clock signal by the delay time to generate a second internal clock signal;
  a second inverter, receiving the second internal clock signal to generate a delayed clock signal; and
  a multiplexer, selecting either the clock signal or the delayed clock signal as a drive signal according to a selection signal;
  wherein the second switched capacitor circuit controls the first transistor, the second transistor, the third transistor, and the fourth transistor of the second switched capacitor circuit to be turned on or off according to the drive signal.

* * * * *